(12) United States Patent
Rolfs et al.

(10) Patent No.: US 12,094,011 B2
(45) Date of Patent: *Sep. 17, 2024

(54) SYSTEMS AND METHODS FOR IDENTIFYING A MCC-MISCLASSIFIED MERCHANT

(71) Applicant: MASTERCARD INTERNATIONAL INCORPORATED, Purchase, NY (US)

(72) Inventors: Melinda L. Rolfs, Pleasantville, NY (US); Jonathan Trivelas, Stormville, NY (US); Nicole Marie Katzman, Bronx, NY (US); Paul John Paolucci, West Harrison, NY (US); Gary Adler, Teaneck, NJ (US); Luis F. Rodriguez-Lemus, Stamford, CT (US); Xianzhe Zhou, Town and Country, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 44 days.

This patent is subject to a terminal disclaimer.

(21) Appl. No.: 18/056,152

(22) Filed: Nov. 16, 2022

(65) Prior Publication Data

US 2023/0079865 A1    Mar. 16, 2023

Related U.S. Application Data

(63) Continuation of application No. 16/718,737, filed on Dec. 18, 2019, now Pat. No. 11,514,533.

(51) Int. Cl.
*G06Q 40/00* (2023.01)
*G06F 16/23* (2019.01)
(Continued)

(52) U.S. Cl.
CPC ......... *G06Q 40/12* (2013.12); *G06F 16/2379* (2019.01); *G06F 16/953* (2019.01); *G06Q 20/4016* (2013.01)

(58) Field of Classification Search
None
See application file for complete search history.

(56) References Cited

U.S. PATENT DOCUMENTS

| 7,263,506 B2 | 8/2007 | Lee |
| 8,175,908 B1 | 5/2012 | Anderson |

(Continued)

FOREIGN PATENT DOCUMENTS

WO    2018005635 A2    1/2018

*Primary Examiner* — Fateh M Obaid
(74) *Attorney, Agent, or Firm* — Armstrong Teasdale LLP

(57) ABSTRACT

A computer system for identifying merchant category code misclassifications includes at least one processor in communication with a transaction database and a merchant database. The transaction database stores transaction records by a plurality of account holders. The processor generates a first MCC profile including at least one transaction characteristic representative of merchants properly classified as the first MCC and comparing the first MCC profile to a second set of transaction records. If the comparison satisfies a comparison threshold for the first MCC the processor identifies the corresponding selected merchant as being MCC misclassified.

20 Claims, 7 Drawing Sheets

(51) Int. Cl.
*G06F 16/953* (2019.01)
*G06Q 20/40* (2012.01)
*G06Q 40/12* (2023.01)

(56) References Cited

U.S. PATENT DOCUMENTS

| | | |
|---|---|---|
| 9,460,190 B1 | 10/2016 | Hein |
| 10,810,574 B1 | 10/2020 | Wilson |
| 2007/0214140 A1 | 9/2007 | Dom |
| 2009/0132347 A1 | 5/2009 | Anderson |
| 2009/0132366 A1 | 5/2009 | Lam |
| 2009/0132395 A1 | 5/2009 | Lam |
| 2010/0021036 A1 | 1/2010 | Chen |
| 2010/0306029 A1* | 12/2010 | Jolley ............... G06Q 30/0201 705/7.29 |
| 2016/0203220 A1 | 7/2016 | Kothuvatiparambil |
| 2016/0321666 A1 | 11/2016 | Dragushan |
| 2016/0364728 A1 | 12/2016 | DeLawter |
| 2017/0169497 A1* | 6/2017 | Lee ................... G06Q 30/0631 |
| 2019/0005491 A1 | 1/2019 | Grassadonia |
| 2019/0095922 A1 | 3/2019 | Watson |
| 2019/0205885 A1 | 7/2019 | Lim |
| 2020/0118132 A1 | 4/2020 | Schmidt |
| 2020/0118133 A1 | 4/2020 | Schmidt |
| 2021/0192640 A1* | 6/2021 | Rolfs ..................... G06Q 20/12 |
| 2021/0209601 A1* | 7/2021 | Dutta ................... G06Q 20/12 |

* cited by examiner

SYSTEMS AND METHODS FOR IDENTIFYING A MCC-MISCLASSIFIED MERCHANT

CROSS REFERENCE TO RELATED APPLICATIONS

This application is a continuation of, and claims priority to, U.S. application Ser. No. 16/718,737, filed Dec. 18, 2019, and entitled "SYSTEMS AND METHODS FOR IDENTIFYING A MCC-MISCLASSIFIED MERCHANT," the entire contents of which is hereby incorporated by reference in its entirety.

BACKGROUND

The field of the present disclosure relates generally to identifying merchant category code (MCC) misclassifications, and more particularly to systems and methods for identifying a merchant classified under a MCC code that does not accurately reflect the primary business of the merchant.

The MCC is assigned to merchants to classify merchants into categories based on the primary types of goods or services they sell. More specifically, the MCC assigned to each and every merchant should accurately reflect the predominant business of the merchant. The MCC is used by multiple parties during a payment transaction, e.g., issuing banks (i.e., customer's financial institution), acquiring banks (i.e., merchant's financial institution), and a payment processing network.

The acquiring bank uses the MCC to determine interchange fees, the transaction fees paid by the acquiring bank, to cover the cost of risks involved in approving a payment transaction with the merchant. High-risk merchants are associated with high-risk industries, which pose a greater risk of chargebacks (i.e., the return of funds to a consumer initiated by an issuing bank), have an elevated fraud risk, and/or are heavily regulated in certain jurisdictions. For example, high-risk merchants may include online casinos, online pharmacies, adult content websites, and the sale of cryptocurrencies. High-risk merchants pay a higher interchange rate than lower risk merchants, and acquiring banks identify high-risk merchants based on their assigned MCC.

The MCCs are also used by the issuing bank to determine a cash back reward. The issuing bank may provide incentives or rewards to the cardholders for purchase transactions made with certain types of merchants. For example, the issuing bank may pay a cash back reward to cardholders for purchase transaction made with grocery stores and supermarkets. The issuing bank utilizes the MCC assigned to the merchant to confirm that the cardholder initiated a purchase transaction with a grocery store. In addition, the MCC may be used to restrict payment transactions and to determine legal and tax reporting duties. For example, online gambling is only permitted in a few states within the United States and issuers may use the MCC to identify and prevent gambling transactions coming from states in which online gambling is restricted.

For at least these reasons, it is crucial that the MCC assigned to each merchant accurately reflects the predominant business of the merchant. Typically, acquiring banks are tasked with the duty of assigning a MCC to merchants. In some cases, the merchants provide descriptions or documentations of the types of goods and services the merchant provides. The payment processing network provides MCC assignment guidelines and MCC classification descriptions to acquiring banks. Acquiring banks may evaluate the merchant documentation provided by the merchant along with the guidelines and descriptions provided by the payment processing network to assign a MCC to the merchant.

In some cases, the MCC assigned to the merchant may not accurately represent the primary business of the merchant. For example, the acquirer may mistakenly assign an incorrect MCC to a merchant, i.e., the acquiring bank may have misinterpreted the merchant documentation or incorrectly applied the guidelines. In other cases, a merchant may have intentionally provided misleading information about the primary business of the merchant, for example a high-risk merchant may provide fraudulent or misleading documentation in order to be assigned to a lower risk MCC for the purpose of eliciting a lower interchange rate.

Often it is too tedious and time consuming for the acquiring bank to manually investigate each and every merchant doing business with the acquiring bank to confirm that the merchant is correctly assigned to a MCC. Acquiring banks typically do not have the computing resources or personnel available for painstaking review of merchant's actual business operations (e.g., via web searches of the merchant's business activities or electronic information requests via the merchant's consumer portal or email) as compared to the merchant information provided to the acquiring bank and the assigned MCC. Moreover, while payment networks have access to transaction data for merchants across a large number of acquiring banks, a correspondingly larger amount of computing resources and personnel trained in detection would be required to reliably investigate merchants one-by-one to locate MCC-misclassified merchants. It is desirable to have a system capable of automatically identifying merchants that are likely MCC-misclassified that operates with reduced or eliminated manual input, no requirement for additional dedicated data collection, no dependence on merchant-provided descriptions of the merchant's business, and reduced usage of computer resources.

BRIEF DESCRIPTION

In one aspect, a computer system for identifying merchant category code (MCC) misclassifications is provided. The computer system includes a transaction database, a high-risk merchant database, and at least one processor in communication with the high-risk merchant database and the transaction database. The transaction database storing a plurality of transaction records each associated with one of a plurality of transactions by one of a plurality of account holders at one of a plurality of merchants, wherein each transaction record includes a transaction identifier associated with the respective transaction, an account number associated with the respective account holder, and a merchant identifier associated with the respective merchant. The high-risk merchant database storing a plurality of high-risk merchant records each associated with one of a plurality of high-risk merchants, wherein the plurality of high-risk merchants is a subset of the plurality of merchants, and wherein each high-risk merchant record includes the merchant identifier assigned to the high-risk merchant, a merchant name, a high-risk MCC assigned to the merchant identifier, and merchant data associated with the high-risk merchant. The at least one processor is configured to (i) query the transaction database for transaction records including the merchant identifier of one or more high-risk merchants to retrieve a first set of transaction records, (ii) calculate a high-risk cardholder metric for each of the account numbers included in the first set of transaction records, wherein the high-risk cardholder metric is based on at least one cardholder transaction characteristic of the records associated with the respective account number in the first set, (iii) for each account number having the high-risk cardholder metric satisfying a high-risk cardholder criterion, add the account number to a list of high-risk cardholders, (iv) query the transaction database for transaction records including (a) the account number of any of the list of high-risk cardholders, and (b) the merchant identifier associated with other than the plurality of high-risk merchants, to retrieve a second set of transaction records, (v) calculate a high-risk merchant metric for each of the merchant identifiers included in the second set of transaction records, wherein the high-risk merchant metric is based on at least one merchant transaction characteristic of the records in the second set, and (vi) for each merchant identifier having the high-risk merchant metric satisfying a misclassification criterion, identify the corresponding merchant as being MCC misclassified.

In another aspect, a computer implemented method for identifying merchant category code (MCC) misclassifications is provided. The method is implemented using a computer device including at least one processor in communication with a transaction database and a high-risk merchant database. The transaction database stores a plurality of transaction records each associated with one of a plurality of transactions by one of a plurality of account holders at one of a plurality of merchants, wherein each transaction record includes a transaction identifier associated with the respective transaction, an account number associated with the respective account holder, and a merchant identifier associated with the respective merchant. The high-risk merchant database stores a plurality of high-risk merchant records each associated with one of a plurality of high-risk merchants, wherein the plurality of high-risk merchants is a subset of the plurality of merchants, and wherein each high-risk merchant record includes the merchant identifier assigned to the high-risk merchant, a merchant name, a high-risk MCC assigned to the merchant identifier, and merchant data associated with the high-risk merchant. The method includes (i) querying, by the at least one processor, the transaction database for transaction records including the merchant identifier of one or more high-risk merchants to retrieve a first set of transaction records, (ii) calculating, by the at least one processor, a high-risk cardholder metric for each of the account numbers included in the first set of transaction records, wherein the high-risk cardholder metric is based on at least one cardholder transaction characteristic of the records associated with the respective account number in the first set, (iii) for each account number having the high-risk cardholder metric satisfying a high-risk cardholder criterion, adding, by the at least one processor, the account number to a list of high-risk cardholders, (iv) querying, by the at least one processor, the transaction database for transaction records including (a) the account number of any of the list of high-risk cardholders, and (b) the merchant identifier associated with other than the plurality of high-risk merchants, to retrieve a second set of transaction records, (v) calculating, by the at least one processor, a high-risk merchant metric for each of the merchant identifiers included in the second set of transaction records, wherein the high-risk merchant metric is based on at least one merchant transaction characteristic of the records in the second set, and (vi) for each merchant identifier having the high-risk merchant metric satisfying a misclassification criterion, identifying, by the at least one processor, the corresponding merchant as being MCC misclassified.

In another aspect, a non-transitory computer-readable storage medium that includes computer-executable instructions executable by at least one processor for identifying merchant category code (MCC) misclassifications is provided. The at least one processor is in communication with a transaction database and a high-risk merchant database. The transaction database stores a plurality of transaction records each associated with one of a plurality of transactions by one of a plurality of account holders at one of a plurality of merchants, wherein each transaction record includes a transaction identifier associated with the respective transaction, an account number associated with the respective account holder, and a merchant identifier associated with the respective merchant. The high-risk merchant database stores a plurality of high-risk merchant records each associated with one of a plurality of high-risk merchants, wherein the plurality of high-risk merchants is a subset of the plurality of merchants, and wherein each high-risk merchant record includes the merchant identifier assigned to the high-risk merchant, a merchant name, a high-risk MCC assigned to the merchant identifier, and merchant data associated with the high-risk merchant. When executed by the at least one processor, the instructions cause the at least one processor to (i) query the transaction database for transaction records including the merchant identifier of one or more high-risk merchants to retrieve a first set of transaction records, (ii) calculate a high-risk cardholder metric for each of the account numbers included in the first set of transaction records, wherein the high-risk cardholder metric is based on at least one cardholder transaction characteristic of the records associated with the respective account number in the first set, (iii) for each account number having the high-risk cardholder metric satisfying a high-risk cardholder criterion, add the account number to a list of high-risk cardholders, (iv) query the transaction database for transaction records including (a) the account number of any of the list of high-risk cardholders, and (b) the merchant identifier associated with other than the plurality of high-risk merchants, to retrieve a second set of transaction records, (v) calculate a high-risk merchant metric for each of the merchant identifiers included in the second set of transaction records, wherein the high-risk merchant metric is based on at least one merchant transaction characteristic of the records in the second set, and (vi) for each merchant identifier having the high-risk merchant metric satisfying a misclassification criterion, identify the corresponding merchant as being MCC misclassified.

BRIEF DESCRIPTION OF THE DRAWINGS

FIG. 1 is a schematic diagram illustrating an example multi-party payment processing system for enabling payment-by-card transactions with a merchant assigned to a MCC.

FIG. 2 is a flow diagram illustrating a first example method of identifying a MCC-misclassified merchant.

FIG. 3 is a flow diagram illustrating a second example method of identifying a MCC-misclassified merchant.

FIG. 4 is a flow diagram illustrating a third example method of identifying a MCC-misclassified merchant.

FIG. 5 is a flow diagram illustrating a fourth example method of identifying a MCC-misclassified merchant.

FIG. 6 is a flow diagram illustrating a fifth example method of identifying a MCC-misclassified merchant FIG. 7 shows an example configuration of a MCC-misclassification identification computing device, in accordance with examples of the present disclosure.

DETAILED DESCRIPTION

Figure 1:
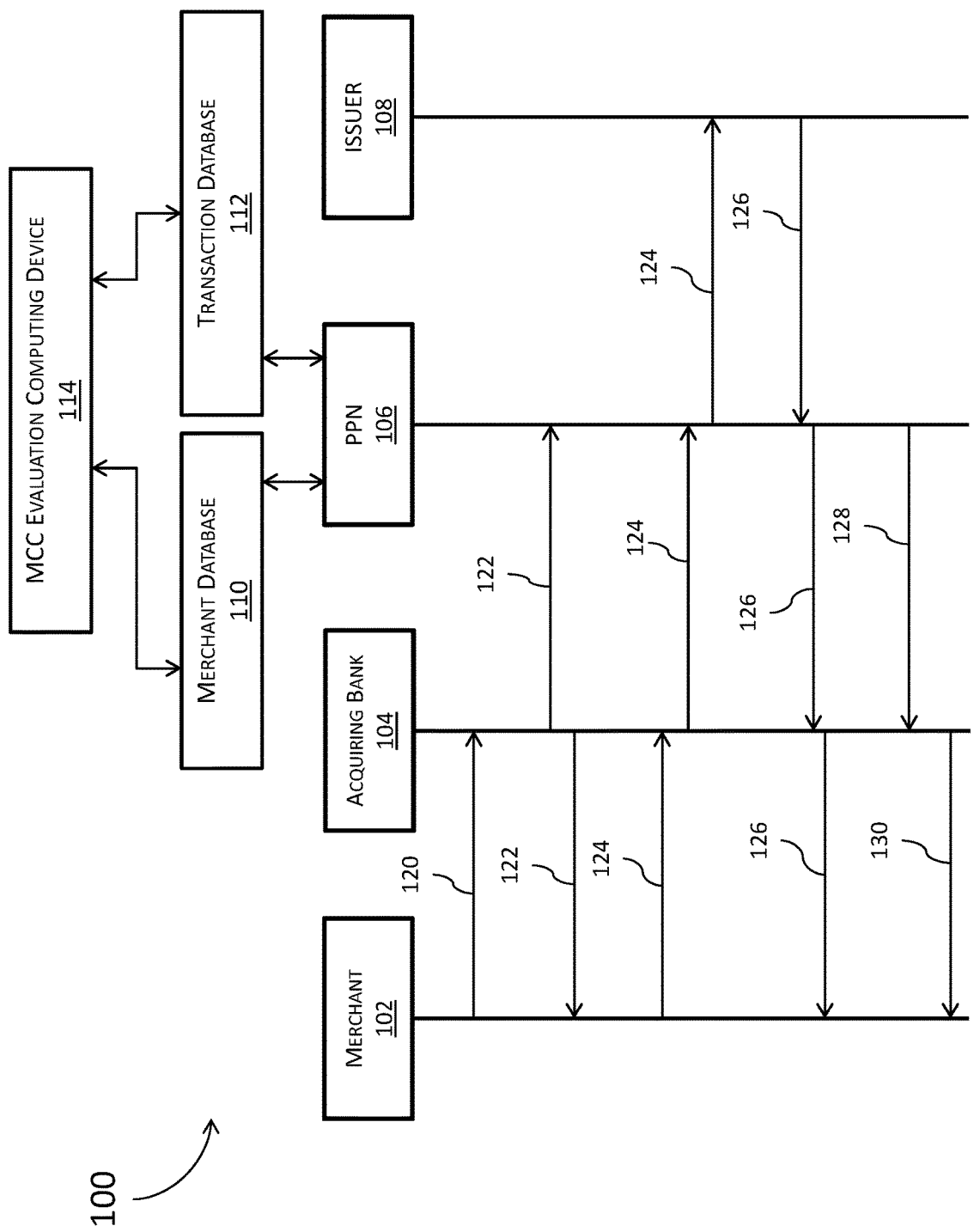
FIGS. 1-7 show example embodiments of the methods and systems described herein.

The systems and methods described herein are directed to identifying MCC-misclassified merchants. An MCC-misclassified merchant is a merchant which has been incorrectly assigned to a merchant category code (MCC). The MCC is a classification code assigned to a merchant based on the merchant's predominant business activity (i.e., the primary goods or services provided by the merchant). More specifically, the MCC classifies merchants into specific market segments or categories. The MCCs are assigned to accurately reflect the merchant's primary business to facilitate risk management, assign interchange fees, and/or enable other value-added services to be provided by participants in a payment processing network. The MCC code may be a four-digit number or an alphanumeric code that is used to distinguish subtle differences between merchant types. For example, a MCC consisting of MCC5811 may be assigned to merchants that provide services associated with the preparation and delivery of food and drinks (i.e., a catering service) while a MCC consisting of MCC5812 may be assigned to merchants that prepare food and drink for immediate consumption (i.e., a restaurant). In some cases, more than one MCC may be assigned to a merchant. For example, a fuel filling station connected with a convenience store may be assigned to a first MCC representing fuel dispensing and a second MCC representing the face-to-face sale of other goods and services. The point-of-sale (POS) devices at such a merchant may be programmed to select either the first or second MCC for a given transaction based on the goods or services being purchased, or on a location of the POS device within the merchant premises.

MCC codes are typically assigned by an acquirer (i.e., the merchant's financial institution or the merchant's bank). Acquirers aim to assign a valid and accurate MCC that most reasonably describes the primary business of the merchant. A payment processing network (e.g., a processing server device of the payment processing network) may provide guidelines and detailed descriptions of MCCs to assist acquires in assigning MCCs to merchants. More specifically, the payment processing network provides rules and responsibilities that acquirers have with merchants when assigning a MCC to a merchant. In addition, the guidelines explain how acquirers should assign one or more MCCs to a merchant such that the description associated with the MCC most accurately describes the business of the merchant.

Merchants may provide acquirers descriptions or documentation of the types of goods and services sold by the merchant. For example, a merchant may provide merchant data associated with the merchant, including merchant locations (i.e., the geographical location of a brick-and-mortar store or the location of ecommerce), financial statements, or images and or descriptions of the goods and services sold by the merchant. Utilizing the merchant data provided by the merchant and the guidelines provided by the payment processing network, the acquirer may assign a MCC to the merchant. In some cases, the assigned MCC does not accurately reflect the primary business of the merchant. For example, the merchant may provide the acquirer misleading information about the primary business of the merchant. In some cases, the acquirer may misinterpret the documentation provided by the merchant or the acquirer may erroneously apply the guidelines for assigning a MCC. In other cases, the primary business of the merchant may have changed over time such that a previously assigned MCC no longer reflects the business of the merchant.

The MCC is used by multiple parties during a payment transaction. The issuer may use the MCC to determine if the issuer may accept a payment transaction from the merchant or to identify a prohibited business. For example, online gambling is only permitted in a few states within the United States. Issuers may use the MCC to identify a transaction with a merchant associated with gambling, and then to prevent gambling transactions from states that do not allow online gambling.

In addition, the MCC may be used to determine a credit card reward provided to cardholders for making purchases a certain types of merchants. For example, an issuer may provide a cash-back reward to incentivize customers to make purchases with grocery stores and supermarkets. The issuer may use the MCC to confirm that a transaction was performed at a grocery store and thus eligible for the targeted reward.

The MCC may also be used to assess the risk associated with the merchant to determine interchange fees (i.e., interchange plus pricing, true pricing, cost-plus pricing, etc.). The interchange fee is a fee paid by the acquirer to the issuer to compensate the issuer for values and benefits that the merchants receive when they accept electronic payments. In addition, the interchange fee is also associated with the risk associated with performing transactions with merchants. For example, low risk merchants, such as supermarkets, gas stations, and hotels, typically receive special reduced interchange fee pricing, which is an incentive for these merchants to accept credit cards. High-risk merchants may include start up organizations, merchants in industries that are heavily regulated, merchants in industries subject to an increased risk of fraudulent or frequent returns, or merchants in industries associated with a negative public perception of the industry as a whole. For example, high-risk merchants may include betting and casino gambling, wire transfer and money orders, cigar stores and or stands, and/or merchants offering drugs, proprietaries and sundries.

The MCC assigned to a merchant is not always correctly assigned, that is, the MCC does not always accurately reflect the predominant business of the merchant. In some cases, the predominant business of the merchant may have changed over time and the MCC assigned to the merchant may have not been updated. In some cases, the acquirer may have misinterpreted the guidelines provided by the payment processing network for MCC assignment. In other cases, the acquirer may have misinterpreted the predominant business of the merchant or the merchant may have been misleading when providing a merchant description to the acquirer. For example, a high-risk merchant may wish to be categorized under a lower risk MCC in order to receive a lower interchange fee and may provide misleading or fraudulent information to the acquirer about the predominant business being performed by the merchant. The acquirer may not have the resources to perform the time consuming task of investigating and verifying the predominant business of every single merchant to ensure that an appropriate MCC code has been assigned.

In some examples of the present disclosure, a computing system for identifying a MCC-misclassified merchant is communicatively coupled to a merchant database and a transaction database. The computing system accesses one or both of the merchant database or the transaction database in order to identify the MCC-misclassified merchant. The MCC-misclassified merchant is associated with a merchant that has been assigned to an incorrect MCC. More specifically, the MCC-misclassified merchant's MCC does not accurately describe or reflect the primary business of the merchant.

The merchant database includes a plurality of merchant records associated with a respective plurality of merchants. Each merchant has a merchant account with an acquiring institution. Each merchant record includes a merchant name, a merchant identification (merchant ID) associated with the respective merchant, a MCC assigned to the merchant, and merchant data associated with the merchant. Merchant data may include a merchant location, i.e., the location of the merchant's store or the geographical region of multiple merchant stores. Merchant data may include descriptions and documentation of the primary goods and services provided by the merchant.

A customer (also referred to herein as a payor, user, or cardholder) initiates a purchase transaction ("payment transaction") by providing payment credentials (e.g., a credit or debit card number, a bank account number, user log-in information corresponding to saved payment credentials, digital wallet information, etc.) to a merchant for the exchange of goods and services.

The transaction database includes a plurality of transaction records each associated with a plurality of transactions by one of a plurality of account holders at one of the plurality of merchants in the merchant database. Each transaction record includes a transaction identifier (transaction ID) associated with the respective transaction. Each transaction record further includes an account number associated with the respective account holder and the merchant ID associated with the respective merchant in the merchant database. Each of the transaction records may also include transaction data including a date/time of the transaction, a transaction amount, and/or a description of the goods or services purchased in the transaction. In other words, the transaction database includes information regarding historical transactions between a plurality of cardholders with a plurality of merchants contained in the merchant database. Either one or both of the merchant database or the transaction database may be filtered using a filtering criterion. Filtering the merchant database may be used to decrease or limit the total number of merchant records in the merchant database that will be considered in a given database operation. Likewise, filtering the transaction database may be used to decrease or limit the total number of transaction records in the transaction database that will be considered in a given database operation.

The filtering criterion may be the location of the merchant. For example, the merchant database may be filtered such that merchant records in the merchant database include locations contained with a certain state or region. In other example embodiments, the merchant database may be filtered by a criterion based on the transaction records associated with the merchant. For example, the merchant database may be filtered by an average transaction amount or a number of chargebacks during a period of time, etc.

The filtering criterion may be based on transaction data, for example, the transaction database may be filtered by the date of the transaction, such that only includes transaction records that occurred during a specified period of time are considered in a particular database operation. In other examples, the transaction database may be filtered by transaction amount, such that only transaction records with transaction amounts greater than a specified dollar amount are considered in a particular database operation. In addition, the merchant database and or the transaction database may be filtered by a single criterion or a plurality of criteria.

At least one technical problem solved by the systems and methods provide herein includes: (i) large amount of manual engagement required for detailed review of merchant's actual business operations as compared to the merchant information provided to the acquiring bank in order to identify a MCC-misclassified merchant, (ii) unreliability of information provided by high-risk merchants for the purpose of assigning a MCC, (iii) additional dedicated computer resources (web searches, electronic inquiries) required to independently evaluate merchant's actual business focus, and (iv) inability to automatically reassign a MCC-misclassified merchant to a more accurate MCC.

A technical effect or improvement provided by the systems and processes described herein includes at least one of: (i) automatically identifying merchants that are likely MCC-misclassified without requiring manual review of the merchant's data, (ii) automatically identifying merchants that are likely MCC-misclassified using consumer payment transaction data previously submitted over a payment processing network in the normal course of business, without requiring additional data gathering such as web searches of the merchant's business or electronic inquiries through the merchant's consumer-facing electronic resources, (iii) automatically identifying merchants that are likely MCC-misclassified without relying on potentially fraudulent merchant-provided descriptions of the merchant's business, (iv) recommending a new MCC for a MCC-misclassified merchant, and (v) automatically reassigning a MCC-misclassified merchant to a new MCC.

As used herein, a processor may include any programmable system including systems using micro-controllers, reduced instruction set circuits (RISC), application specific integrated circuits (ASICs), logic circuits, and any other circuits or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and thus are not limiting as to the types of memory usable for saving of a computer.

In one embodiment, a computer program is provided, and the program is embodied on a computer readable medium. In an example embodiment, the data optimization system is executed on a single computer system, without requiring a connection to a server computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein.

Each component and process can also be used in combination with other assembly packages and processes.

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

FIG. 1 is a signal flow diagram of a payment system 100 including a merchant 102, an acquiring bank 104, and an issuer bank or issuer 108 in communication with each other via a payment processing network 106. The payment processing network 106 is further in communication with a merchant database 110 and a transaction database 112. In some embodiments, payment processing network 106 is a payment card interchange network using proprietary communications protocols, such as the payment network operated by the Mastercard International Incorporated, the assignee of the present disclosure. Such a network is comprised, in part, of a set of proprietary communication standard and protocols for the exchange of financial transaction data and the settlement of funds between financial institutions that are members of the payment network.

In a typical payment system, issuer 108 issues a payment card associated with a payment card account, such as a credit card, debit card, electronic check, prepaid card, paper check, mobile phone with access to the payment card account, or any other form of payment, to a cardholder, who uses the payment card to tender payment for a purchase from a merchant 102. To accept payment with the payment card, merchant 102 must normally establish an account with acquiring bank 104 (also referred to herein as "merchant bank," the "acquiring bank," or the "acquirer"). In the example, merchant 102 initially registers with acquiring bank 104 to do business with payment processing network 106. More specifically, merchant 102 transmits a registration request message 120 including a description of the business associated with the merchant 102. The description of the business may include written descriptions of the goods and or service sold or provided by the merchant 102, documentation of financial reports, and or images/videos of the merchant's 102 location and or goods or services. Upon receiving registration request message 120, acquiring bank 104 determines and assigns a MCC code to merchant 102 that most accurately reflects the goods and service provided by the merchant 102, as best understood by acquiring bank 104 based on the information provided by merchant 102.

In this example, acquiring bank 104 transmits a notification message 122 to merchant 102. Notification message 122 includes the MCC that acquiring bank 104 has assigned to the merchant 102 and an interchange fee set by payment processing network 106. The interchange fee is determined, at least partially, by the MCC code that is assigned to the merchant 102. Typically, merchants 102 that are associated with a high-risk business or have been assigned to a high-risk MCC code are associated with a higher interchange fee than merchants 102 assigned to other than a high-risk MCC. Merchants 102 may wish to pay a lower or decreased interchange fee and in some cases, merchant 102 may provide an inaccurate or false registration request message 120 that includes false or misleading documentation of the types of goods and services provided by merchant 102. Notification message 122 is also transmitted to payment processing network 106.

In the example, payment processing network 106 stores at least a portion of the information provided in registration request 120 and at least a portion of the information provided in notification message 122 in merchant database 110. Merchant database 110 includes a plurality of merchant records associated with a respective plurality of merchants 102. Each merchant 102 has a merchant account with a respective acquiring institution 104. Each merchant record includes a merchant name, a merchant identifier (merchant ID) associated with the respective merchant 102, the MCC assigned to the respective merchant 102, and merchant data associated with the merchant 102. For example, the merchant data may include the location of the merchant 102, a description of the goods and services provided by the merchant 102, or any additional data associated with the merchant 102.

When the cardholder tenders payment for a purchase using a payment card account, merchant 102 transmits an authorization request message 124 to acquiring bank 104 requesting authorization for the amount of the purchase. The authorization request message 124 may be transmitted over the telephone, but is usually transmitted through the use of a point-of-sale (POS) terminal, which reads the cardholder's account information from a magnetic stripe, a chip, a mobile device including a digital wallet application, embossed characters, or other device on the payment card that may be manually inputted into the POS terminal, and communicates electronically with the transaction processing computers of acquiring bank 104. In some cases, acquiring bank 104 may authorize a third party to perform transaction processing on its behalf. In this case, the point-of-sale terminal will be configured to communicate with the third party. Such a third party is usually called a "merchant processor," an "acquiring processor," or a "third party processor," and it should be understood that communications described herein as involving acquiring bank 104 encompass communications involving the merchant processor acting for acquiring bank 104.

Authorization request message 124 is forwarded from the computers of acquiring bank 104 via servers of the payment processing network 106 to computers of issuer 108. Issuer 108 determines whether the payment transaction should be authorized. This may include a number of factors such as whether the cardholder's account is in good standing and whether the purchase is covered by cardholder's available credit line (in the case of a credit card authorization) or existing account funds (in the case of a debit card authorization). The issuer 108 transmits an authorization response message 126 via servers of the payment processing network to merchant 102 indicating whether the payment transaction is authorized or declined. If authorized, the authorization response message 126 includes an authorization code, and if declined, the authorization response message 126 includes a reason code indicating a reason for the decline (e.g., insufficient funds).

When a request for authorization is accepted, the available credit line of the cardholder's payment card account is decreased. In some cases, a charge for a payment transaction may not be posted, i.e., "captured" immediately to the cardholder's payment card account, whereas in other cases, especially with respect to at least some debit card transactions, a charge may be posted or captured at the time of the transaction. In some cases, when merchant 102 ships or delivers the goods or services, merchant 102 captures the transaction by, for example, appropriate data entry procedures on the POS terminal. This may include bundling of approved transactions daily for standard retail purchases. If the cardholder cancels a transaction before it is captured, a "void" is generated. If the cardholder returns goods after the transaction has been captured, a "credit" is generated.

After a purchase has been made, a clearing process occurs to transfer additional transaction data related to the purchase among the parties to the transaction, such as acquiring bank 104, payment network 106, and issuer 108. After a transaction is authorized and cleared, the transaction is settled among merchant 102, acquiring bank 104, and issuer bank 30. Settlement refers to the transfer of financial data or funds among merchant's 102 accounts, acquiring bank 104 and issuer bank 108 related to the transaction. Usually, transactions are captured and accumulated into a "batch," which is settled as a group. More specifically, a transaction is typically settled between issuer bank 108 and payment network 106, and then between payment network 106 and acquiring bank 104, and then between acquiring bank 104 and merchant 102. In some examples, during settlement a plurality of settlement messages may be exchanged (not shown)

Payment network 106 stores information extracted from one or more of authorization request messages 124, authorization response messages 126, clearing-related messages (not shown), and settlement-related messages (not shown) in transaction database 112. Transaction database 112 includes a plurality of transaction records each representative of a transaction occurring with one of a respective plurality of merchants 102. Each transaction record includes a transaction identifier (transaction ID) uniquely associated with the respective transaction, the merchant ID associated with the respective merchant 102 at which the transaction occurs, the MCC assigned to the respective merchant 102, the transaction amount, and any other suitable transaction data. For example, additional transaction data may include the date and time of the transaction or additional data associated with the transaction.

In the example, payment processing network 106 also transmits a periodic invoice message 128 to acquiring bank 104. Periodic invoice message 128 includes a summary of transactions that occurred during the relevant time period and a summary of interchange fees charged to acquiring bank 104, based at least in part on the MCC assigned to each merchant 102 and the number of transactions. Further in the example, acquiring bank 104 sends a periodic merchant invoice message 130 to each merchant 102. Merchant invoice message 130 includes an invoice for interchange fees charged in turn by acquiring bank 104 to the respective merchant 102, based on the MCC assigned to the merchant 102 and the number of transactions occurring with the merchant 102. Again, the interchange fee is determined, at least partially, by the MCC code that is assigned to the merchant 102. Merchants 102 that are associated with a high-risk business or have been assigned to a high-risk MCC code are associated with a higher interchange fee than merchant 102 assigned to other than a high-risk MCC. Merchants 102 may wish to pay a lower or decreased interchange fee and in some cases, merchant 102 may provide an inaccurate or false registration request message 102 that includes false or misleading documentation of the types of goods and service of merchant 102.

In the example embodiment, payment system 100 further includes MCC evaluation (MCCE) computing device 114. MCCE computing device 114 is in communication with merchant database 110 and transaction database 112, either via payment processing network 106 or through a separate communication channel (e.g., secure Internet connection). In some examples, MCCE computing device 114 is implemented as part of the servers of payment processing network 106. Alternatively, MCCE computing device 114 is implemented independently from the servers of payment processing network 106, and payment processing network 106 provides suitable access to data stored by payment processing network 106 in merchant database 110 and transaction database 112. As discussed in more detail below, MCCE computing device 114 includes at least one processor 702 (shown in FIG. 7) programmed to execute at least one algorithm to identify MCC-misclassified merchants 102. In certain examples, the at least one processor 702 is further programmed to recommend a reassignment of the MCC, or to automatically reassign the MCC of the misclassified merchants.

Figure 2:
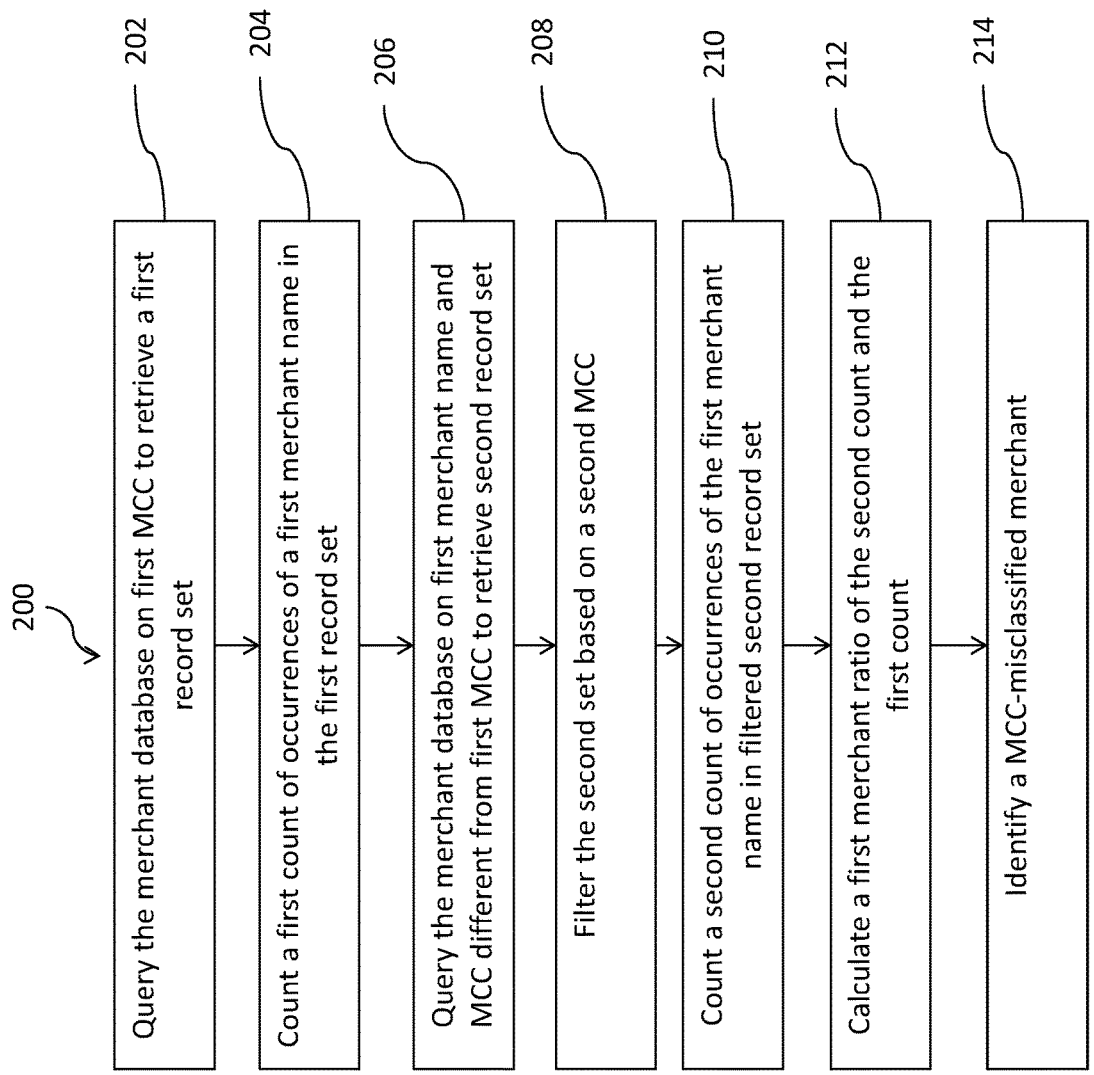

FIG. 2 is a process flow of a first example method 200 for identifying a MCC-misclassified merchant 102. The MCC-misclassified merchant 102 is a merchant that has been assigned to an incorrect MCC. More specifically, the MCC-misclassified merchant's MCC does not accurately describe or reflect the primary business of the merchant. In the example embodiment, method 200 is implemented by MCCE computing device 114 (shown in FIG. 1). MCCE computing device 114 includes at least one processor 702 (shown in FIG. 7) that is communicatively coupled to merchant database 110.

Method 200 includes the at least one processor querying 202 merchant database 110 for merchant records including a first MCC to retrieve a first set of the plurality of merchant records. The first set of the plurality of merchant records includes merchants 102 that are assigned to the same MCC, i.e., the first MCC. In some embodiments, merchant database 110 may have been previously filtered based on one or more filtering criteria. The filtering criteria may include a location of the merchants, such that the query 202 only operates on merchants 102 located within a specific geographical region or state. In other examples, any suitable filtering criteria may be used.

Method 200 further includes the at least one processor counting 204 a first count. More specifically, the first count is the number of occurrences of a first name in the first set of merchant records. In other words, the first count is associated with the number of merchants with the same merchant name contained in the first set of the plurality of merchant records.

To illustrate implementation of method 200, a first example has been provided. In this first example, the first MCC may be associated with Bakeries (i.e., merchant that sell baked goods such as pastries, breads, and the like). For this example, we can denote the first MCC as "MCC-Bakery". Merchants assigned to the first MCC of "MCC-Bakery" are retrieved in the first set of the plurality of merchant records. In this first example, a first merchant name may be the name of "Grandma's Bakery" which is included in the first set of the plurality of merchant records. Further, "Grandma's Bakery" may be a chain with a plurality of store locations, such that there is a corresponding plurality of merchant records with the merchant name of "Grandma's Bakery" (i.e., a separate merchant record for each location). More specifically, the first count of the number of occurrences of the merchant name "Grandma's Bakery" contained in the first set of merchant records may be a number greater than one, for this example, the first count of the number of occurrences of the first name in the first set of merchant records is 10.

Method 200 further includes the at least one processor querying 206 the merchant database 110 for merchant records including the first merchant name and wherein the merchant is assigned to a MCC different from the first MCC to obtain a second set of plurality of merchant records. In other words, the second set of the plurality of merchant records includes merchants with the first merchant name that are assigned to a MCC that is not the same as the first MCC. In some examples, the second set of the plurality of merchant records may include a plurality of merchants having the first merchant name but assigned to multiple different MCCs, each of which also differs from the first MCC.

Method 200 also includes the at least one processor filtering 208 the second set of the plurality of merchant records based on a second MCC. The second MCC is different from the first MCC, and may be selected from among the one or more MCCs present in the second set of merchant records. In this example, the second set of the plurality of merchant records is filtered such that the second set of the plurality of merchant records includes merchants assigned to the same MCC, i.e. the second MCC that is different from the first MCC. It should be understood that in some examples, steps 206 and 208 may be performed simultaneously if a second MCC of interest is predetermined, for example by querying the merchant database 110 for merchant records including the first merchant name and the predetermined second MCC.

Continuing with the previously described first example involving the first MCC of "MCC-Bakery" and the first merchant name of "Grandma's Bakery", querying 206 the merchant database 110 for the first merchant name for merchants assigned to MCCs different from the first MCC returns merchant records with the first merchant name "Grandma's Bakery" wherein the merchants have been assigned to one or more MCCs other than the first MCC of "MCC-Bakery". This may return multiple merchant records with different MCCs. Filtering 208 the second set of merchant records returns merchants with the first merchant name of "Grandma's Bakery" that are assigned to the same MCC, i.e., the second MCC. For example, the second MCC may be associated with fueling stations and the like and the second MCC may be denoted "MCC-fuel".

Method 200 further includes the at least one processor counting 210 a second count of the number of occurrences of the first merchant name in the filtered second set of merchant records. In other words, counting 210 a second count includes counting the number of merchant records contained in the filtered second set of merchant records.

Likewise, continuing with the previously described first example, counting 210 the second count of the number of occurrences of the first merchant name of "Grandma's Bakery" assigned to the second MCC of "MCC-fuel" may be a number equal to or greater than one. In this first example, the second count of the number of occurrences of the first merchant name in the second set of the plurality of merchant records may be 2. In other words, the merchant name of "Grandma's Bakery" assigned to the MCC of "MCC-fuel" includes 2 merchant records in the filtered second set.

Method 200 further includes the at least one processor calculating 212 a first merchant ratio of the second count and the first count. In other words, the first merchant ratio is a ratio associated with merchant records including the same merchant name but assigned to the first MCC and the second MCC. In some examples, the first merchant ratio may include the first count in the numerator and the second count in the denominator. In other examples, the first merchant ratio may include the second count in the numerator and the first count in the denominator.

Method 200 further includes, in response to the merchant ratio satisfying a misclassification criterion, the at least one processor identifying as being MCC-misclassified the merchants corresponding to one of (i) the first set of merchant records and (ii) the filtered second set of merchant records. In many cases, for each group of merchants having the same name, it may be assumed that if the first count is much greater than the second count, then the merchant records assigned to the first MCC are correctly assigned and the merchant records assigned to the second MCC are incorrectly assigned. Likewise, if the second count is much greater than the first count, then the merchant records assigned to the second MCC are likely correctly assigned and the merchant records assigned to the second MCC are likely incorrectly assigned. The first merchant ratio may be used to determine if either the first set of merchant records or the second set of merchant records are MCC-misclassified.

More specifically, the misclassification criterion may include both an upper threshold value that is met where the numerator count exceeds the denominator count by a certain proportion, and a lower threshold value that is met where the denominator count exceeds the numerator count by the corresponding proportion. For example, where the second count is in the numerator and the first merchant ratio exceeds the upper threshold value (i.e., there are significantly more merchants with the same name assigned to the second MCC rather than to the first MCC), the MCC-misclassified merchant corresponds to the first set of merchant records, i.e. the first MCC is likely incorrectly assigned to the merchants in the first set of records. For another example, where the second count is in the numerator and the first merchant ratio is less than the lower threshold value (i.e., there are significantly more merchants with the same name assigned to the first MCC rather than to the second MCC), the MCC-misclassified merchant corresponds to the filtered second set of merchant records, i.e., the second MCC is likely incorrectly assigned to the merchants in the filtered second set of records. In other examples, the first merchant ratio includes the first count in the numerator, and similar upper and lower thresholds are applied.

Continuing with the previous first example, if the first merchant ratio is defined to have the second count in the numerator and the first count in the denominator, calculating the first merchant ratio of second count and first count would yield 2:10 or 0.2. In this example, the misclassification criterion may be an upper threshold value of 1:10 or 0.1, and the first merchant ratio of 0.2 exceeds this upper threshold value, thereby satisfying the misclassification criterion. As such, the MCC-misclassified merchant corresponds to the second set of merchant records. In this example, it may be interpreted that merchant name of "Grandma's Bakery" assigned to "MCC-fuel" is likely a MMC-misclassified merchant.

In some examples, method 200 further includes repeating step 208 for a third MCC in the second record set, and then repeating steps 210 through 214 for the re-filtered second record set. In other examples, the method 200 further includes the at least one processor identifying or confirming a correct MCC for merchants having the first merchant name. For example, if the misclassification criterion includes the first merchant ratio meeting the upper or lower threshold value indicating that, for example, the second MCC is incorrectly assigned, then the first MCC will also be identified as being the correct MCC. In this case, merchants in the second set of records and having MCCs other than the second MCC may automatically be identified as likely MCC-misclassified, without cycling through steps 208 through 214 for each MCC in the second set of merchant records. Likewise, if the misclassification criterion includes the first merchant ration being greater than an upper threshold value, indicating that the first MCC is incorrectly assigned, then the second MMC will be identified as being the correct MCC. In some such examples, the at least one processor may apply confirmation upper and lower threshold values for identification of a "correct" MCC that require a greater proportion than the upper and lower threshold values used to identify an incorrect MCC.

In certain examples, the method 200 further includes the at least one processor automatically changing the MCC-misclassified merchant to the identified correct MCC. For example, if the second MCC is determined to be incorrectly assigned, then the merchant record for each merchant in the filtered second set of records will be updated to replace the second MCC with the first MCC, and the acquirer 104 and/or merchant 102 may be automatically notified of the change. In other examples, the identified MCC-misclassified merchants are further investigated to determine the predominant business of the merchant. In some cases, the MCC-misclassified merchant may reassigned to a MCC that is different from the first MCC and the second MCC. For example, the MCC-misclassified merchant may be reassigned to a third MCC that is associated with a miscellaneous MCC.

Figure 3:
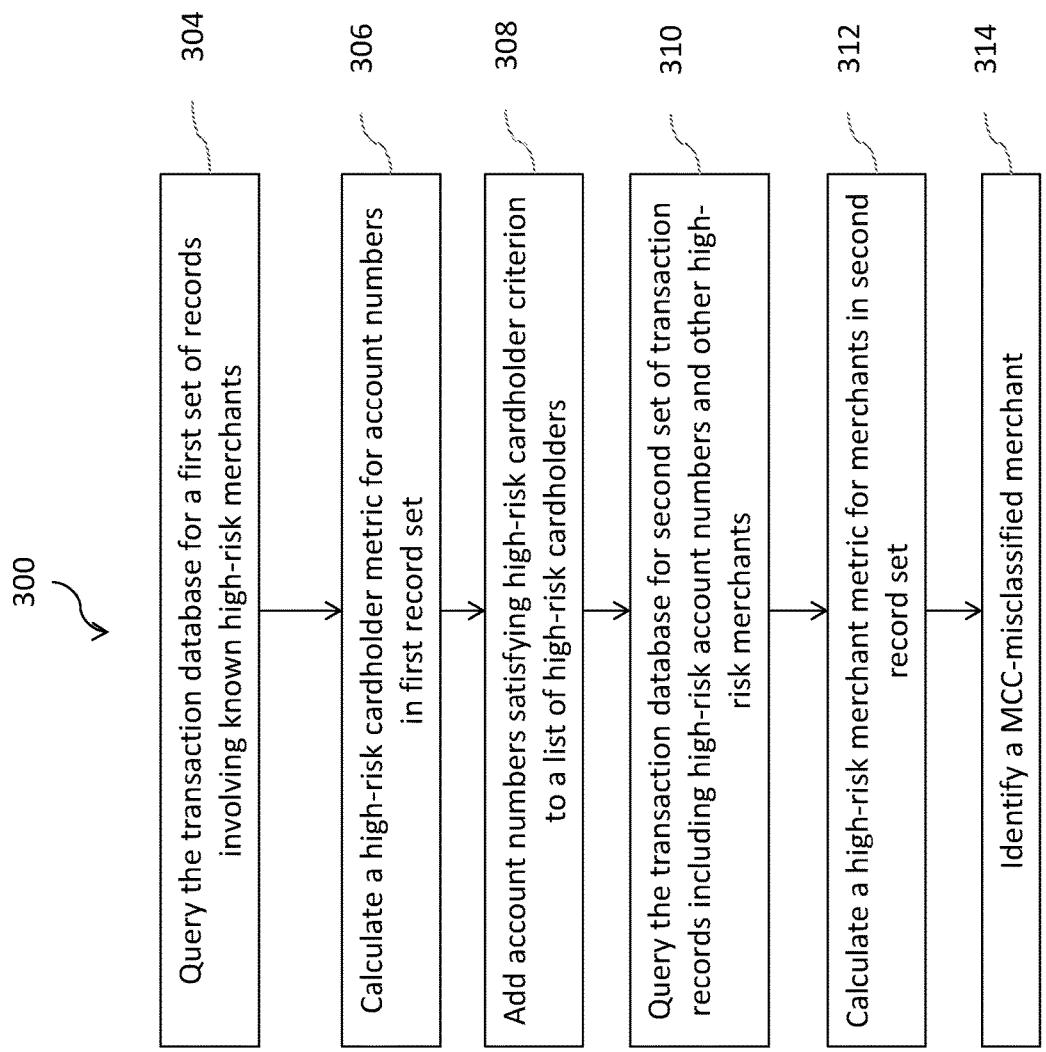

FIG. 3 is a process flow of a second example method 300 for identifying a MCC-misclassified merchant 102. In the example embodiment, method 300 is implemented by MCCE computing device 114 (shown in FIG. 1). The MCCE computing device 114 includes at least one processor 702 (shown in FIG. 7) that is communicatively coupled to merchant database 110 and transaction database 112.

In the example, the merchant database 110 includes at least some merchants 102 assigned to one or more high-risk MCCs. For example, the high-risk MCC may be associated with an industry or business type that generates a higher incidence of cardholder disputes, increased levels of financial risk (e.g., increased risk of transactions not settling), and/or a relatively high amount of governmental regulation. For example, merchants assigned to high-risk MCCs may be associated with wire transfers & money orders, drug stores and pharmacies, cigar stores and stands, betting and casino gambling, direct marketing-subscription, etc. As such, for purposes of method 300, the merchant database 110 may be called the high-risk merchant database. In some examples, merchant database 110 may be pre-filtered based on one or more high-risk MCCs, and the results stored in separate tables or other data structures for later access by the at least one processor for selecting one or more known high-risk merchants while executing method 300. In other examples, the at least one processor applies a high-risk MCC filter to a full merchant database 110 to enable selection of one or more known high-risk merchants as part of the method 300. Alternatively, any suitable method is used to select one or more known high-risk merchants.

Method 300 includes the at least one processor querying 304 the transaction database 112 for transaction records including the merchant ID of one or more high-risk merchants to retrieve a first set of transaction records. In other words, the first set of transaction records includes historical transaction records for transactions occurring with selected known high-risk merchants 102 (i.e., merchants contained in the high-risk merchant database 110 due to assignment to one or more high-risk MCCs). In some examples, transaction database 112 may have been previously filtered based on one or more filtering criteria. The filtering criteria may include dates and times of transaction records contained in the transaction database 112, such that query 304 only operates on historical transactions occurring during a specific time period. In other examples, any suitable filtering criteria may have been used.

Method 300 includes the at least one processor calculating 306 a high-risk cardholder metric for each of the account numbers included in the first set of transaction records. The high-risk cardholder metric is based on at least one cardholder transaction characteristic of the transaction records associated with the respective account number in the first set of transaction records. In other words, the cardholder transaction characteristic may be calculated using the transaction data contained in the transaction records that include the respective account number. For example, the at least one cardholder transaction characteristic may include the number of transaction records (i.e., the number of purchases initiated by a specific cardholder) with the one or more known high-risk merchants over a period of time. Additionally or alternatively, the at least one cardholder transaction characteristic may include an average and/or a sum of the transaction amounts in the transaction records (i.e., the average-per-transaction or total amount of money spent by the cardholder) with the one or more known high-risk merchants over a period of time. Additionally or alternatively, the at least one cardholder transaction characteristic may include an identification of a pattern evident in the transaction records; this may include an analysis of a frequency of transactions at a high-risk merchant (e.g., a cardholder may subscribe to a service with a high-risk merchant) to identify that the cardholder has a transaction record occurring at approximately the same time each month for approximately the same transaction amount. The high-risk cardholder metric is calculated in any suitable fashion from the at least one cardholder transaction characteristic. For example, the high-risk cardholder metric includes a weighted average of the numerically expressed cardholder transaction characteristics and/or a predefined increase in response to the presence of a pattern cardholder transaction characteristic. For another example, high-risk cardholder metric includes a plurality of values each corresponding to different cardholder transaction characteristics.

For each account number having the high risk-cardholder metric satisfying a high-risk card cardholder criterion, method 300 includes adding 308 the account number to a list of high-risk cardholders. In other words, account numbers having a high-risk cardholder metric satisfying the high-risk cardholder criterion are added to a list of high-risk cardholders. In general, an account number for which the high-risk cardholder metric satisfies the high-risk cardholder criterion is one that may be expected to transact in a similar fashion with additional merchants in the same business or industry, and this assumption may be used to identify other merchants in the same business or industry which are assigned, incorrectly, to non-high-risk MCCs.

For example, the cardholder metric may include the total transaction amount of the transaction records occurring with a high-risk merchant, for a period of time, and the corresponding high-risk cardholder criterion may be $100.00 dollars per month. In other words, if an account holder spends more than $100.00 per month with one or merchants assigned to a high-risk MCC then the account number of the cardholder is added to a list of high-risk cardholders. In other examples, the cardholder metric may include a total number of transaction records with a merchant assigned to a high-risk MCC for a period of time, and the corresponding high-risk cardholder criterion may be 10 transaction records per month. In other words, if a cardholder makes over 10 purchase transactions with one or more known high-risk merchants, then the account number of the cardholder is added to the list of high-risk cardholders. Additionally or alternatively, the high-risk cardholder criterion includes a value that corresponds to the high-risk cardholder metric being a composite of a plurality of cardholder transaction characteristics (e.g., weighted average, etc.).

Method 300 includes the at least one processor querying 310 the transaction database 112 for transaction records including (i) the account number of any of the list of high-risk cardholders, and (ii) the merchant identifier associated with other than the plurality of high-risk merchants, to retrieve a second set of transaction records. In other words, the second set of transaction records includes transaction records for each account number in the list of high-risk cardholders with ostensibly non-high-risk merchants, i.e., with merchants that are not assigned to any high-risk MCC.

Method 300 includes the at least one processor calculating 312 a high-risk merchant metric for each of the merchant identifiers included in the second set of transaction records based on at least one merchant transaction characteristic of the records in the second set. In other words, the high-risk merchant metric is based or calculated for each merchant from at least one characteristic of the transaction records associated with the respective merchant in the second set of transaction records. The at least one merchant transaction characteristic may include a number of different account numbers having transaction records in the second set with the merchant, i.e., the number of different high-risk cardholders who initiated purchase transactions with the respective merchant in the second set of transaction records. Additionally or alternatively, the at least one merchant transaction characteristic may include a total number of transaction records per cardholder with the merchant over a period of time. Additionally or alternatively, the at least one merchant transaction characteristic may include a per-cardholder average and/or sum of the transaction amounts (i.e., the average-per-transaction or total amount of money spent) with the merchant over a period of time. Additionally or alternatively, the at least one merchant transaction characteristic may include an identification of a per-cardholder pattern evident in the transaction records, as discussed above. The high-risk merchant metric is calculated in any suitable fashion from the at least one merchant transaction characteristic. For example, the high-risk merchant metric includes a weighted average of the numerically expressed merchant transaction characteristics and/or a predefined increase in response to the presence of a pattern merchant transaction characteristic. For another example, high-risk merchant metric includes a plurality of values each corresponding to different merchant transaction characteristics.

For each merchant identifier having the high-risk merchant metric satisfying a misclassification criterion, method 300 further includes the at least one processor identifying 314 the corresponding merchant as being MCC-misclassified. For example, if the high-risk merchant metric includes a per-cardholder sum of transaction amounts with the respective merchant in the second set of transaction records over a period of time, then the misclassification criterion may be $100.00 per month. In other words, if a threshold number of high-risk cardholders each spends more than $100.00 per month with a merchant included in the second set of transaction records, then the corresponding merchant ID may be identified as being MCC misclassified.

For another example, if the high-risk merchant metric includes the total number of transaction records per cardholder with the respective merchant in the second set over a period of time, then the misclassification criterion may be 10 transactions per month. In other words, if a threshold number of high-risk cardholders each initiates more than 10 transactions per month with a merchant included in the second set of transaction records, then the corresponding merchant ID may be identified as being MCC misclassified.

For another example, if the high-risk merchant metric includes the number of different account numbers, associated with high-risk cardholders, initiating purchase transactions with the respective merchant in the second set over a period of time, then the misclassification criterion may be 10 account numbers. In other words, if more than a threshold number of high-risk cardholders initiate purchase transactions with the same merchant assigned to an MCC other than a high-risk MCC, then that merchant may be identified as a MCC-misclassified merchant.

Additionally or alternatively, the high-risk merchant criterion includes a value that corresponds to the high-risk merchant metric being a composite of a plurality of merchant transaction characteristics (e.g., weighted average, etc.).

In some examples, method 300 further includes the at least one processor suggesting a correct MCC. For example, if the merchant identifier has the high-risk merchant metric satisfying the misclassification criterion, indicating that the MCC is incorrectly assigned to the merchant associated with the merchant identifier, then the high-risk MCC associated with the one or more known high-risk merchants from step 304 may be suggested as the correct MCC. In other examples, the method 300 further includes the at least one processor automatically changing the MCC-misclassified merchant to the identified correct MCC, and the acquirer 104 and/or merchant 102 may be automatically notified of the change. In other examples, the identified MCC-misclassified merchants are further investigated to determine the predominant business of the merchant. In some cases, the MCC-misclassified merchant may reassigned to a MCC that is different from the first MCC and the high-risk MCC of the one or more known high-risk merchants.

Figure 4:
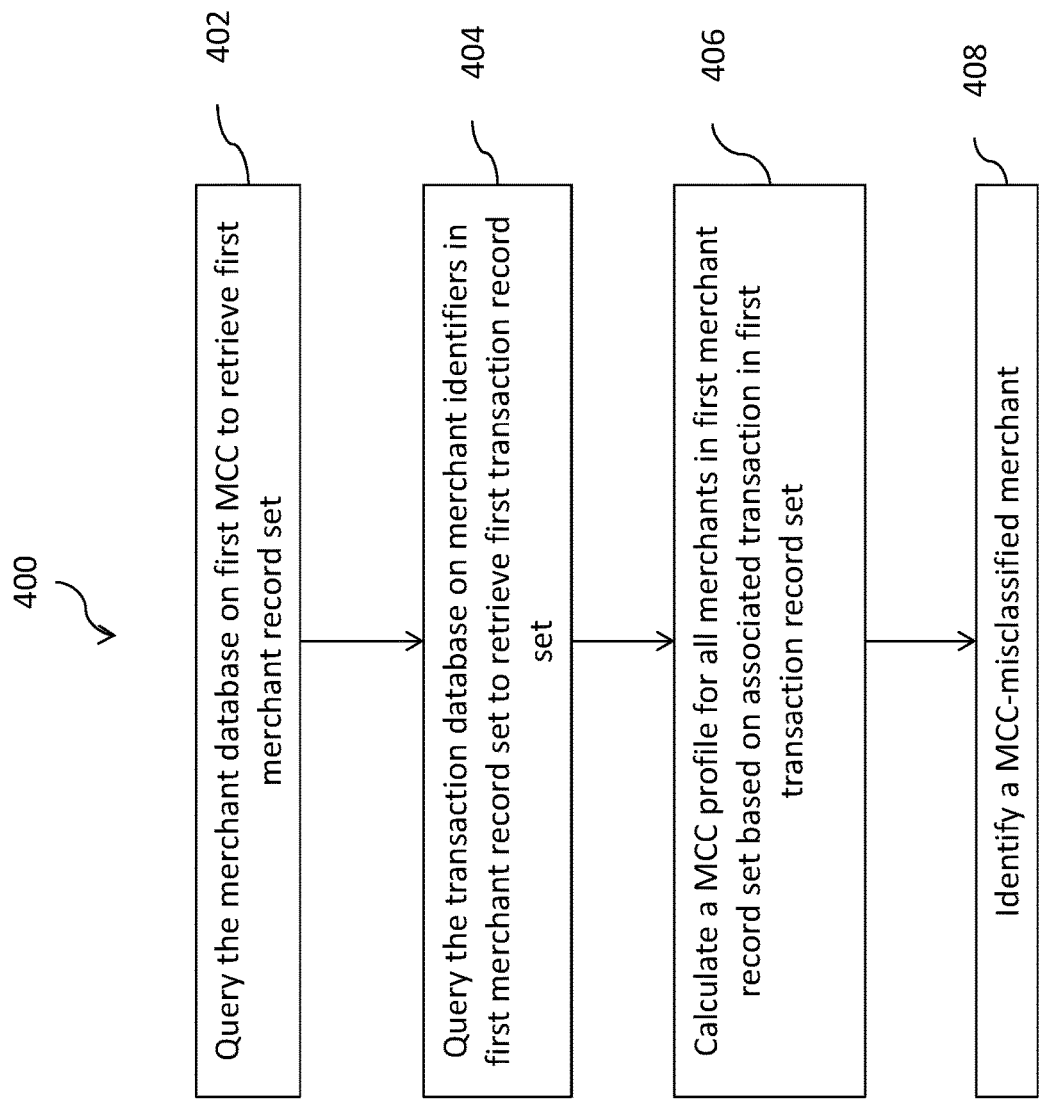

FIG. 4 is a process flow of a third example method 400 for identifying a MCC-misclassified merchant 102. In the example, method 400 is implemented by MCCE computing device 114 (shown in FIG. 1). MCCE computing device 114 includes at least one processor 702 (shown in FIG. 7) that is communicatively coupled to merchant database 110 and transaction database 112.

Method 400 includes the at least one processor querying 402 the merchant database 110 for merchant records including a first MCC to retrieve a first set of the plurality of merchant records. In other words, the first set of the plurality of merchant records includes a plurality of merchants assigned to the same MCC, i.e., the first MCC. In some examples, merchant database 110 may have been previously filtered based on one or more filtering criteria. The filtering criteria may include a location of the merchants, such that the query 402 only operates on merchants 102 located within a specific geographical region or state. In other examples, any suitable filtering criteria may be used.

Method 400 also includes the at least one processor querying 404 the transaction database 112 for transaction records including merchant identifiers contained in the first set of merchant records to retrieve a first set of the plurality of transaction records. In other words, the first set of transaction records includes purchase transactions initiated with the merchants in the first set of merchant records assigned to the first MCC. In some examples, transaction database 112 may have been previously filtered based on one or more filtering criteria. The filtering criteria may include a date and time of transaction, such that the query 402 only operates on transactions occurring during a specific date or time period. In other examples, any suitable filtering criteria may be used.

Method 400 also includes the at least one processor calculating 406 a MCC profile for each merchant identified in the first set of transaction records. The MCC profile includes at least one metric calculated from the first set of transaction records.

In some example embodiments, the at least one metric includes a median transaction amount. Additionally or alternatively, the at least one metric includes a customer revisit rate. The customer revisit rate is associated with the number of positive (e.g., purchase authorization request) transactions per account holder with the merchant. In addition, the at least one metric be a percentage of negative transactions. The negative transactions are associated with at least one of a refund, reversal, and/or a chargeback transaction.

In some examples, the MCC profile is dependent upon the types of goods and services provided by merchant. In other words, the MCC profile calculated from the first set of transaction records will be representative of typical customer interactions over time with merchant 102, and can be expected to be within a range of similarity for all merchants 102 correctly classified under the first MCC. To illustrate implementation of method 400, a second example is provided. In the second example, the first MCC may be "MCC-Grocery" which is assigned to merchants which sell food merchandise for home consumption, and the like. The first query returns a list of merchant records assigned to "MCC-Grocery". The second query returns a list of transaction records with those merchants assigned to "MCC-Grocery".

The MCC profile includes at least one metric calculated from the first set of transaction records of the merchants assigned to "MCC-Grocery." For example, the at least one metric may include the average transaction amount of transaction records for each merchant. The average transaction amount for grocery stores may be in the range of $50.00, i.e., the average amount spent by cardholders during a transaction with a grocery store is approximately $50.00. In another example, the at least one metric includes the number of negative transaction in the first set of transactions over a period of time. A negative transaction is associated with a chargeback transaction, a refund or a reversal, i.e., a cardholder may have returned goods and received a refund payment. The average percentage of negative transaction per a time period of a month may be in the range of 10%. The MCC profile may include more than one metric and/or may include a single value that is a combination of multiple calculated metrics.

For each merchant identifier having the MCC profile satisfying a misclassification criterion, method 400 further includes the at least one processor identifying 408 a MCC-misclassified merchant. The misclassification criterion is associated with determining an anomaly merchant with a MCC profile that is different, by a specified threshold, from the MCC profile of the other merchants assigned to the first MCC. A merchant having a significantly different MCC profile compared to other merchants' MCC profiles for the same MCC may be an indication that the merchant has been misclassified. In other words, an outlier merchant may be identified if the outlier merchant's MCC profile is different (an outlier) relative to other MCC profiles of merchants assigned to the same MCC.

Continuing with the second example described above, the at least one metric further includes the median transaction amount for transaction records of the merchant. The median amount per merchant, averaged over all merchants in the first set of merchant records, is, e.g., $100.00. The misclassification criterion may be the median transaction amount for a particular merchant 102 being at least 170% of the median transaction records averaged for all merchants having the first MCC. In this example, if the median transaction record for a merchant 102 in the first set of merchant records is $170.00 or greater, then the merchant ID is identified as a MCC-misclassified merchant.

In some example embodiments, the misclassification criterion may be a method to determine an outlier MCC profile, such that a merchant with a substantially different MCC profile, compared to other merchant's MCC profiles, may be identified as being misclassified. An MCC profile being substantially different may be associated with a MCC profile that is an outlier compared with other MCC profiles. The misclassification criterion may be an outlier algorithm, such that the outlier algorithm identifies a MCC-misclassified merchant. In other example embodiments, the outlier algorithm is an isolation forest algorithm.

In some embodiments, the method 400 includes the at least one processor filtering the first set of merchant records prior to calculating 406 the MCC profile, based on transaction records. The first set of merchant records may be filtered to remove merchants having fewer than a threshold number of transactions for a time period of interest. For example, the threshold number of transactions may be 100 and the time period may be three months. Additionally or alternatively, the first set of merchant records may be filtered to remove merchants having greater than a threshold percentage of negative transactions. For example, the threshold percentage may be 50%. Additionally or alternatively, the first set of merchant records may also be filtered to remove merchants having a customer revisit rate greater than a threshold revisit rate value. For example, the threshold revisit rate value may be 25 customers.

Additionally or alternatively, the first set of merchant records may be filtered to remove merchants for which the transaction records indicate a pricing level less than a threshold pricing level. For example, the threshold pricing level may be set based on typical list prices for the industry associated with the MCC. In alternative embodiments, the threshold number of transactions, the threshold percentage of negative transactions, and the threshold customer revisit rate, and the threshold pricing level may be other values. In other example embodiments, the method 400 may instead include the processor filtering the initially identified MCC-misclassified merchants on any of the criteria noted above, after step 406 and/or 408.

Additionally or alternatively, the MCC-misclassified merchants initially identified at step 408 may be filtered based on any other suitable MCC-misclassified merchant filtering criterion. For example, the MCC-misclassified filtering criterion is associated with a sibling store. The sibling store includes the same name as the MCC-misclassified merchant and the sibling store is assigned to a MCC that is the same as the MCC of the identified MCC-misclassified merchant. The sibling store is associated with the same type of store as the MCC-misclassified store. The sibling store may include a MCC profile that is not identified as being an outlier relative the other MCC profiles. For another example, the MCC-misclassified filtering criterion may be associated with a keyword. The keyword is associated with a keyword MCC, and the MCC-misclassified merchant name includes the keyword. The keyword MCC is the same as the MCC of the MCC-misclassified merchant.

In some examples, the method 400 further includes the at least one processor automatically changing the MCC-misclassified merchant to the identified correct MCC, and the acquirer 104 and/or merchant 102 may be automatically notified of the change. In other examples, the identified MCC-misclassified merchants are further investigated to determine the predominant business of the merchant. In some cases, the MCC-misclassified merchant may reassigned to a MCC that is different from the first MCC and the second MCC.

Figure 5:
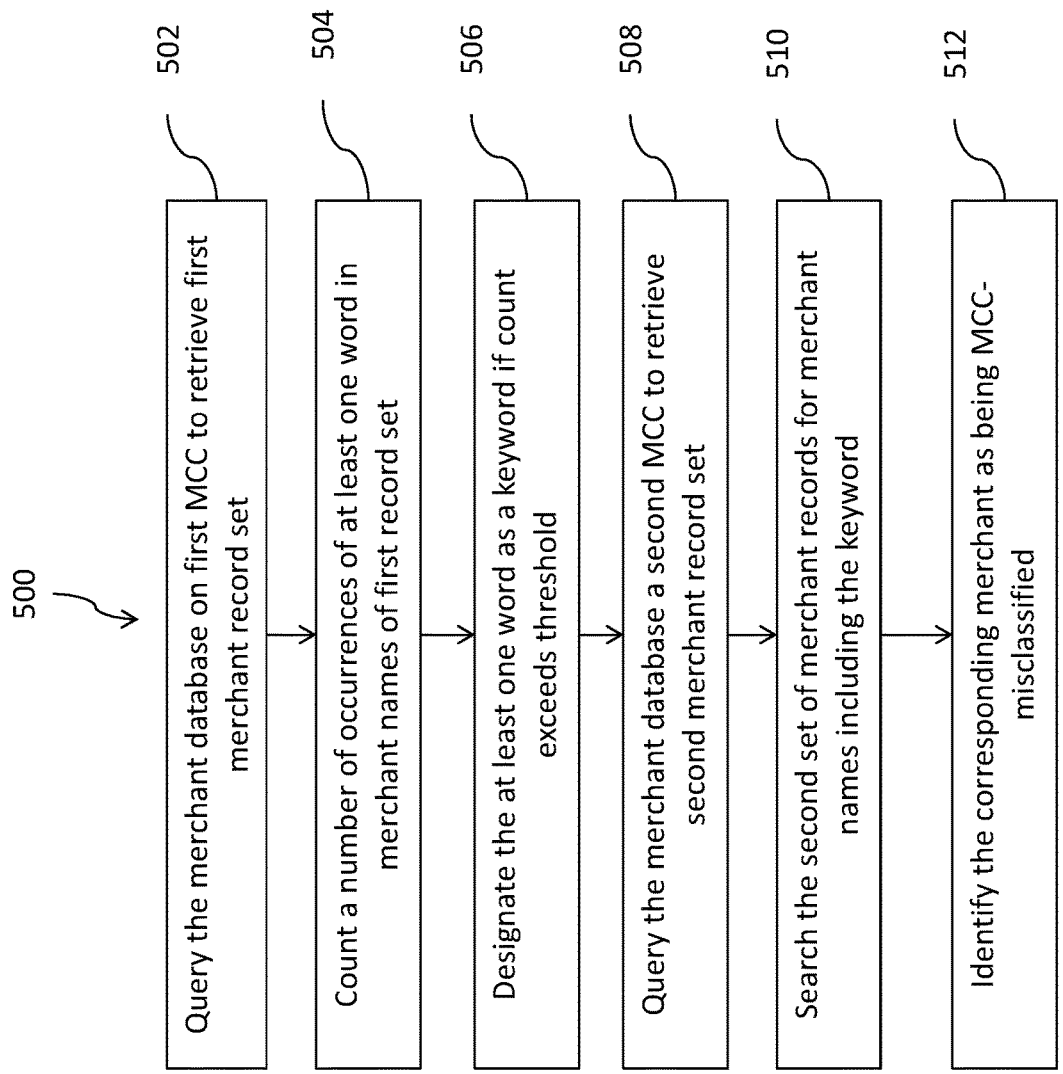

FIG. 5 is a process flow of a fourth example method 500 for identifying a MCC-misclassified merchant 102. In the example embodiment, method 500 is implemented by MCC computing device 114 (shown in FIG. 1). MCCE computing device 114 includes at least one processor 702 (shown in FIG. 7) that is communicatively coupled to merchant database 110.

Method 500 includes the at least one processor querying 502 the merchant database 110 for merchant records including a first MCC to retrieve a first set of the plurality of merchant records. The first set of merchant records includes a set of merchants 102 that are assigned to the same MCC, i.e., the first MCC. In some embodiments, merchant database 110 may have been previously filtered based on one or more filtering criteria. The filtering criteria may include a location of the merchants, such that the query 502 only operates on merchants 102 located within a specific geographical region or state. In other examples, any suitable filtering criteria may be used.

Method 500 includes the at least one processor counting 504, for at least one word of a plurality of words contained in the merchants names in the first set of merchant records, a number of occurrences of the at least one word contained in the merchant names in the first set of merchant records. In order to illustrate implementation of method 500, a third example is provided. In the third example, the first set of the plurality of merchant records may be assigned to the first MCC of "MCC-Airlines". In this third example, the first set of the plurality of merchant records may include various merchant names including the following: "United Airlines". "Frontier Airlines", "American Airlines" etc. In this third example, the at least one word may be selected to be the word "Airlines". The number of occurrences of the at least one word contained in the merchant names, in the first set of merchant records, may be 100. In other words, the number of merchant names including the word "airline" for merchants having the first MCC is 100.

In response to the number of occurrences exceeding a threshold count number, method 500 includes the at least one processor designating 506 the at least one word as a keyword associated with the first MCC. Continuing with the third example described above, the threshold count number may be 50. The number of occurrences of the at least one word contained in the merchant names being 100 exceeds the threshold count number of 50. Therefore, the at least one word of "airlines" will be designated as a keyword for the first MCC of "MCC-Airlines".

Method 500 further includes the at least one processor querying 508 the merchant database 110 for merchant records including a second MCC, wherein the second MCC is different from the first MCC, to retrieve a second set of the plurality of merchant records.

Method 500 includes the at least one processor searching 510 the second set of merchant records for merchant names including the keyword. The second set of merchant records includes merchants assigned to a MCC that is different from the first MCC. Thus, searching 510 the second set of merchant records may return a set of merchant records for which the merchant name includes the keyword associated with the first MCC, but for which the merchant is classified in a different MCC.

For each merchant name in the second set of merchant records that includes the keyword, method 500 includes identifying 512 the corresponding merchant as being MCC-misclassified. Continuing with the third example described above, the second set of merchant records, assigned to a second MCC different from the first MCC of "MCC-Airlines," is searched for merchant names including keyword of "Airlines". If a merchant name in the second set of merchant records includes the keyword "airlines," then the merchant is identified as likely being MCC-misclassified. In the third example, searching the second set of merchant records for the keyword "airlines" returns the merchant name of "Fast Airlines". The merchant ID associated with the merchant name of "Fast Airlines" will be identified as a MCC-misclassified merchant.

In some examples, method 500 further includes the processor identifying a correct MCC, wherein the correct MCC is the first MCC. In some example embodiments, the method 500 includes the processor automatically updating the merchant record of the MCC-misclassified merchant to the correct MCC, and the acquirer 104 and/or merchant 102 may be automatically notified of the change. Continuing with the third example, the correct MCC will be identified as the first MCC of "MCC-Airlines" and the merchant record associated with the merchant name "Fast Airlines" will be updated to replace the second MCC with the new MCC of "MCC-Airlines". In other words, the merchant "Fast Airlines" will be reassigned to the MCC of "MCC-Airlines." In other examples, the identified MCC-misclassified merchants are further investigated to determine the predominant business of the merchant.

Figure 6:
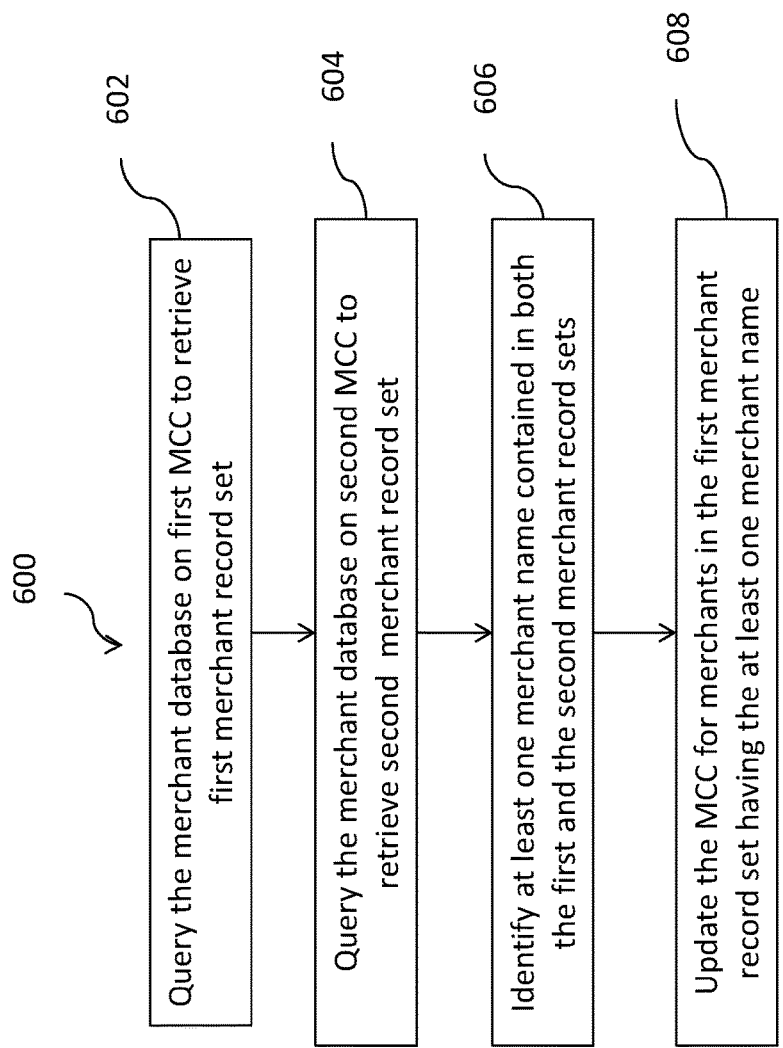

FIG. 6 is a process flow of a fifth example method 600 for identifying a MCC-misclassified merchant 102. In the example embodiment, method 600 is implemented by MCCE computing device 114 (shown in FIG. 1). MCCE computing device 114 includes at least one processor 702 (shown in FIG. 7) that is communicatively coupled to merchant database 110.

Method 600 includes the at least one processor querying 602 the merchant database 110 for merchant records including a first MCC to retrieve a first set of the plurality of merchant records. For example, the first MCC is associated with a miscellaneous MCC. In some embodiments, merchant database 110 may have been previously filtered based on one or more filtering criteria. The filtering criteria may include a location of the merchants, such that the query 602 only operates on merchants 102 located within a specific geographical region or state. In other examples, any suitable filtering criteria may be used.

A miscellaneous MCC is a generic category of MCC and is assigned to merchants not classified elsewhere. A merchant may be assigned a miscellaneous MCC because the merchant provided a limited description of the type of goods and or services provided by the merchant. In other cases, the merchant may have been assigned a miscellaneous MCC because the merchant may be a new company for which it is not yet completely established what the merchant's predominant type of business may be. There may be more than one miscellaneous MCC, for example to account for different reasons for which a more specific MCC could not be assigned.

Method 600 also includes the at least one processor querying 604 the merchant database 110 for merchant records including a second MCC to retrieve a second set of the plurality of merchant records. The second MCC is different from the first MCC. Additionally, the second MCC is not a miscellaneous MCC, i.e., the second MCC is a non-miscellaneous MCC. Thus, the second set of the plurality of merchant records includes merchants assigned to a MCC, i.e., the second MCC, that is different from the miscellaneous MCC.

Method 600 includes the at least one processor identifying 606 at least one merchant name contained in both the second set of merchant records and the first set of merchant records. In other words, step 606 identifies different merchant records with the same merchant name but assigned to different MCCs. At least one of the merchants is assigned to the first MCC, wherein the first MCC is associated with a miscellaneous MCC, and another merchant having the same name is assigned to a second MCC that is not associated with a miscellaneous MCC.

Method 600 further includes the at least one processor automatically updating 608 the MCC for the merchant records associated with the at least one merchant name in the first set of merchant records to match the second MCC, and the acquirer 104 and/or merchant 102 may be automatically notified of the change. In other words, merchants 102 classified in a miscellaneous MCC, but having a name matching merchants classified in more specific MCCs, are updated to the corresponding more specific MCC. In other examples, the identified MCC-misclassified merchants are further investigated to determine the predominant business of the merchant. In some cases, the MCC-misclassified merchant may reassigned to a MCC that is different from the first MCC and the second MCC.

In the example processes, an MCC-misclassified merchant is identified. The MCC-misclassified merchant may be associated with a merchant that has been assigned a MCC that does not accurately reflect the primary business of the merchant. Once a merchant has been identified as being a MCC-misclassified merchant, the merchant may need to be investigated to further identify the primary business of the merchant. In some cases, the MCC-misclassified merchant may automatically be reassigned to a different MCC.

In alternative embodiments, any combination of the methods described may be applied in any sequence to identify one or more MCC-misclassified merchant. In some examples, sequential use of two or more of the described methods on a merchant database, with reference as needed to an associated transaction database, is particularly effective in reducing a number of MCC misclassifications in the merchant database. However, each of the methods described above has utility in reducing a number of MCC misclassifications in the merchant database when used separately as well.

Figure 7:
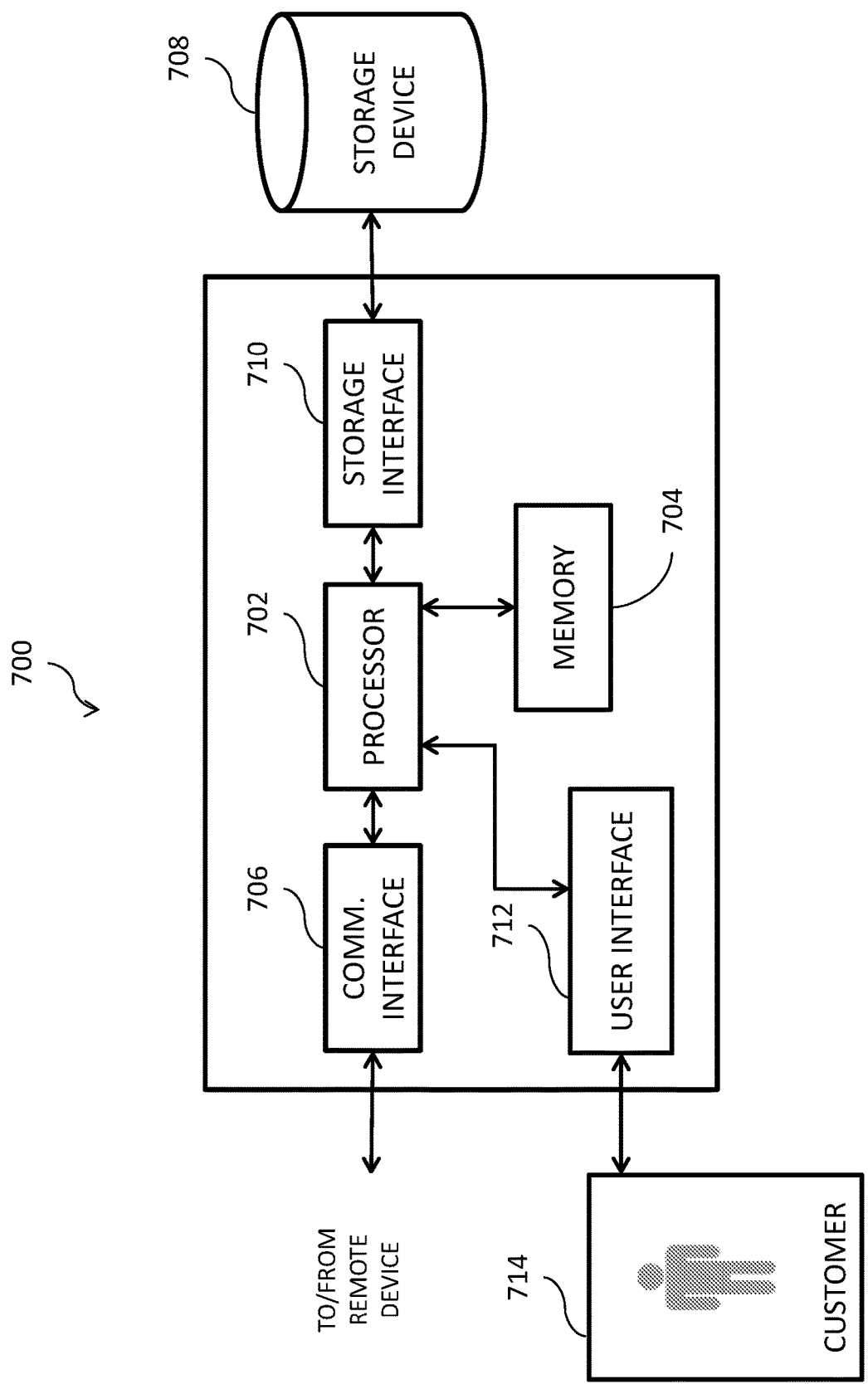

FIG. 7 illustrates an example configuration of a computing device 700, such as the MCCE computing device 114 shown in FIG. 1. Computing device 700 includes at least one processor 702 for executing instructions. Instructions may be stored to a memory 704. The at least one processor 702 may include one or more processing units (e.g., in a multi-core configuration) for executing instructions. The instructions may be executed within a variety of different operating systems on data optimizing computing device, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 702 is operatively coupled to a communication interface 706 such that computing device 700 is capable of communication with remote devices. Processor 702 may also be operatively coupled to at least one storage device 708. For example, the at least one storage device 708 may be used to implement merchant database 110 and transaction database 112. Storage device 708 is any computer-operated hardware suitable for storing and/or retrieving data. In some embodiments, storage device 708 is integrated in computing device 700. For example, computing device 700 may include one or more hard disk drives as storage device 708. In other embodiments, storage device 708 is external to computing device 700. For example, storage device 708 may include multiple storage units such as hard disks or solid state disks in a redundant array of inexpensive disks (RAID) configuration. Storage device 708 may include a storage area network (SAN) and/or a network attached storage (NAS) system.

In some embodiments, processor 702 is operatively coupled to storage device 708 via a storage interface 710. Storage interface is any component capable of providing processor 702 with access to storage device 708. Storage interface 710 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 702 with access to storage device 708.

Memory 704 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Computing device 700 includes at least one user interface 712 for receiving commands and input from and/or presenting information to a user 714. User interface 712 may, for example, be any component capable of converting and conveying electronic information to and/or from user 714. In some embodiments, user interface 712 includes an output adapter (not shown), such as a video adapter or an audio adapter, which is operatively coupled to processor 702 and operatively coupleable to an output device (also not shown), such as a display device (e.g., a cathode ray tube (CRT), liquid crystal display (LCD), light emitting diode (LED) display, or "electronic ink" display) or an audio output device (e.g., a speaker or headphones). In some embodiments, user interface 712 is configured to include and present a graphical user interface (not shown), such as a web browser or a client application, to user 714. User 714 may display or report via user interface 712, e.g., results generated by one or more of the methods described above. Additionally or alternatively, computing device 700 includes an input device (also not shown) for receiving input from user 714. User 714 may use input device, without limitation, to initiate or execute one or more methods or processes described above. Input device may include, for example, a keyboard, a pointing device, a mouse, a stylus, a touch sensitive panel (e.g., a touch pad or a touch screen), a gyroscope, an accelerometer, a position detector, a biometric input device, or an audio input device. A single component such as a touch screen may function as both an output device and input device. Additionally or alternatively, computing device 700 is configured to receive commands to execute one or more of the methods described above from, and/or to transmit results of the methods for display to, a remote device via communication interface 706.

The following is a brief description of the functionality of several embodiments described above.

In a first embodiment, a computer system for identifying merchant category code (MCC) misclassifications is provided. The computer system includes a merchant database and at least one processor in communication with the merchant database. The merchant database stores a plurality of merchant records each associated with a respective merchant of a plurality of merchants. Each merchant record includes a merchant name and a MCC assigned to the merchant name. The processor is configured to (i) query the merchant database for merchant records including a first MCC to retrieve a first set of the plurality of merchant records, (ii) count a first count of the number of occurrences of a first merchant name in the first set of merchant records, (iii) query the merchant database for merchant records including the first merchant name wherein the assigned MCC is other than the first MCC to obtain a second set of the plurality of merchant records, (iv) filter the second set of merchant records based on a second MCC, the second MCC being different from the first MCC, (v) count a second count of the number of occurrences of the first merchant name in the filtered second set of merchant records, (vi) calculate a first merchant ratio of the second count to the first count, and (vii) in response to the first merchant ratio satisfying a misclassification criterion, identify as being MCC-misclassified the merchants corresponding to one of (a) the first set of merchant records and (b) the filtered second set of merchants records.

In some examples of the first embodiment, the system includes the at least one processor further configured to, prior to the step of querying the merchant database, filter the merchant database based on a filtering criterion. The filtering criterion may be based on a geographical location of the merchant.

In some examples of the first embodiment, the misclassification criterion includes the first merchant ratio exceeding an upper threshold value and the MCC-misclassified merchant corresponds to the first set of merchant records.

In some examples of the first embodiment, the misclassification criterion includes the first merchant ration being less than a lower threshold value and the MCC-misclassified merchant corresponds to the filtered second set of merchant records.

In a second embodiment, a computer system for identifying merchant category code (MCC) misclassifications is provided. The computer system includes a merchant database, a transaction database, and at least one processor in communication with the merchant database and the transaction database. The merchant database stores a plurality of merchant records each associated with a respective merchant of a plurality of merchants. Each merchant record includes a merchant name, a merchant identifier, and a MCC assigned to the merchant name. The transaction database stores a plurality of transaction records each associated with one of a plurality of transactions by one of a plurality of account holders at one of a plurality of merchants. Each transaction record includes a transaction identifier associated with the respective transaction, an account number associated with the respective account holder, and the merchant identifier associated with the respective merchant in the merchant database. The at least one processor is configured to (i) query the merchant database for merchant records including a first MCC to retrieve a first set of the plurality of merchant records, (ii) query the transaction database for transaction records including merchant identifiers contained in the first set of merchant records to retrieve a first set of the plurality of transaction records, (iii) calculate a MCC profile for each merchant identifier in the first set of merchant records, the MCC profile including at least one metric calculated from the first set of transaction records, and (iv) for each merchant identifier having the MCC profile satisfying a misclassification criterion, identify the corresponding merchant as being MCC misclassified.

In some examples of the second embodiment, the at least one processor is further configured to filter the merchant database, prior to querying the merchant database, based on a filtering criterion. The filtering criterion is associated with a geographical location of the merchant.

In some examples of the second embodiment, the at least one processor is further configured to filter the merchant database, prior to querying the merchant database, to exclude merchants having transaction records including fewer than a threshold number of transactions for a plurality of time periods. For example, the threshold number of transactions is 100 and the plurality of time periods is three months.

In some examples of the second embodiment, the at least one processor is further configured to filter the merchant database, prior to querying the merchant database, to exclude merchants having transaction records including greater than a threshold percentage of negative transactions. For example, the threshold percentage is 50 percent.

In some examples of the second embodiment, the at least one processor is further configured to filter the merchant database, prior to querying the merchant database, to exclude merchants having transaction records including a customer revisit rate greater than a threshold revisit rate value. For example, the threshold revisit rate value is 25 customers.

In some examples of the second embodiment, the at least one processor is further configured to filter the merchant database, prior to querying the merchant database, to exclude merchants having transaction records including a pricing level less than a threshold pricing level.

In some examples of the second embodiment, the at least one metric includes a median transaction amount. Additionally or alternatively, the at least one metric includes a customer revisit rate, wherein the customer revisit rate is associated with a number of positive transactions per account holder. Additionally or alternatively, the least one metric includes a percentage of negative transactions, the negative transactions are associated with at least one of a refund, a reversal, and a chargeback transaction.

In some examples of the second embodiment, the misclassification criterion is based on an outlier algorithm, wherein the outlier algorithm identifies the MCC-misclassified merchant. For example, the outlier algorithm is an isolation forest algorithm.

In some examples of the second embodiment, the at least one processor is further configured to filter the identified MCC-misclassified merchant based on a MCC misclassified filtering criterion. The MCC-misclassified filtering criterion is associated with a sibling store. The sibling store includes the same name as the MCC-misclassified merchant, and the sibling store is assigned a MCC that is the same as the MCC of the identified MCC-misclassified merchant.

In some examples of the second embodiment, the MCC-misclassified filtering criterion is associated with a keyword, wherein the keyword is associated with a keyword MCC, and wherein the MCC-misclassified merchant name includes the keyword, and wherein the keyword MCC is the same as the MCC of the MCC-misclassified merchant.

In a third embodiment, a computer system for identifying merchant category code (MCC) misclassifications is provided. The computer system includes a merchant database and at least one processor in communication with the merchant database. The merchant database stores a plurality of merchant records each associated with a respective merchant of a plurality of merchants. Each merchant record includes a merchant name and a MCC assigned to the merchant name. The at least one processor is configured to (i) query the merchant database for merchant records including a first MCC to retrieve a first set of the plurality of merchant records, (ii) count, for at least one word of a plurality of words contained in the merchant names in the first set of merchant records, a number of occurrences of the at least one word contained in the merchant names in the first set of merchant records, (iii) in response to the number of occurrences exceeding a threshold count number, designate the at least one word as a keyword, (iv) query the merchant database for merchant records including a second MCC, wherein in the second MCC is different from the first MCC, to retrieve a second set of the plurality of merchant records, (v) search the second set of merchants records for merchant names including the keyword, and (vii) for each merchant name in the second set of merchant records that includes the keyword, identify the corresponding merchant as being MCC misclassified.

In some examples of the third embodiment, the at least one processor is further configured to filter the merchant database, prior to querying the merchant database, based on a filtering criterion. The filtering criterion is a geographical location of the merchant.

In a fourth embodiment, a computer system for identifying merchant category code (MCC) misclassifications is provided. The computer system includes a merchant database and at least one processor in communication with the merchant database. The merchant database stores a plurality of merchant records each associated with a respective merchant of a plurality of merchants. Each merchant record includes a merchant name, a merchant identifier, and a MCC assigned to the respective merchant. The at least one processor is configured to (i) query the merchant database for merchant records including a first MCC to retrieve a first set of the plurality of merchant records, the first MCC is associated with a miscellaneous MCC, (ii) query the merchant database for merchant records including a second MCC to retrieve a second set of the plurality of merchant records, the second MCC is different from the first MCC, (iii) identify at least one merchant name contained in both the second set of merchant records and the first set of merchant records, and (iv) update the MCC for the merchant record associated with the at least one merchant name in the first set of merchant records to match the second MCC.

In some examples of the fourth embodiment, the at least one processor is further configured to filter the merchant database, prior to querying the merchant database, based on a filtering criterion. The filtering criterion is a geographical location of the merchant.

As will be appreciated based on the foregoing specification, the above-described embodiments of the disclosure may be implemented using computer programming or engineering techniques including computer software, firmware, hardware or any combination or subset thereof, wherein the technical effect or enabling individual chargeback tracking, settlement, and recording. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer system for identifying merchant category code (MCC) misclassifications, the computer system comprising:
    a transaction database storing a plurality of transaction records each associated with one of a plurality of transactions by one of a plurality of account holders at one of a plurality of merchants, wherein each transaction record includes a transaction identifier associated with the respective transaction and a merchant identifier associated with the respective merchant;

a merchant database storing a plurality of merchant records each associated with one of a plurality of merchants, wherein each merchant record includes the merchant identifier and a MCC assigned to the merchant identifier;

at least one processor in communication with the merchant database and the transaction database, the at least one processor configured to:

generate a first MCC profile for a first MCC having a first merchant identifier assigned thereto, the first MCC profile including at least one transaction characteristic representative of merchants properly classified as the first MCC;

compare the first MCC profile to a second set of transaction records for transactions initiated with a selected merchant having been assigned to the first MCC to determine if the selected merchant is properly assigned to the first MCC;

if the comparison satisfies a comparison threshold for the first MCC, identify the corresponding selected merchant as being MCC misclassified; and automatically update a secondary merchant database that includes MCC misclassified merchants to include the merchant identifier of the selected merchant.

2. The computer system in accordance with claim 1, wherein the first MCC profile includes at least one transaction characteristic associated with a first set of transaction records from a first set of merchants that have been properly classified as the first MCC.

3. The computer system in accordance with claim 1, wherein the at least one processor configured to:
determine a merchant specific MCC profile based on at least one transaction characteristic in the second set of transaction records; and
compare the merchant specific MCC profile to the first MCC profile.

4. The computer system in accordance with claim 1, wherein the processor is further configured to:
replace the first MCC code of the identified MCC-misclassified merchants with a new MCC in an authorization request message associated with a transaction initiated with the MCC-misclassified merchant.

5. The computer system in accordance with claim 1, wherein the at least one transaction characteristic is associated with a transaction amount.

6. The computer system in accordance with claim 1, wherein the at least one transaction characteristic is associated with a number of recurring payments, wherein the recurring payments include payment transactions having the same amount and timing over a plurality of time periods.

7. The computer system in accordance with claim 1, wherein the at least one transaction characteristic is associated with at least one of a date and a time of transactions of the records.

8. The computer system in accordance with claim 1, wherein the at least one transaction characteristic of the records is associated with at least two of (i) a transaction amount, (ii) a number of recurring payments, wherein the recurring payments includes payment transactions having the same amount and timing over a plurality of time periods, and (iii) at least one of a date and a time of the transactions.

9. The computer system in accordance with claim 1, wherein the at least one processor is further configured to filter the merchant database, prior to querying the transaction database, based on a filtering criterion.

10. The computer system in accordance with claim 9, wherein the filtering criterion is associated with a geographical location of the merchant.

11. A computer implemented method for identifying merchant category code (MCC) misclassifications, the method implemented using a computer device including at least one processor in communication with:

a transaction database storing a plurality of transaction records each associated with one of a plurality of transactions by one of a plurality of account holders at one of a plurality of merchants, wherein each transaction record includes a transaction identifier associated with the respective transaction and a merchant identifier associated with the respective merchant;

a merchant database storing a plurality of merchant records each associated with one of a plurality of merchants, wherein each merchant record includes the merchant identifier and a MCC assigned to the merchant identifier;

wherein the method comprises:
generating a first MCC profile for a first MCC having a first merchant identifier assigned thereto, the first MCC profile including at least one transaction characteristic representative of merchants properly classified as the first MCC;

comparing the first MCC profile to a second set of transaction records for transactions initiated with a selected merchant having been assigned to the first MCC to determine if the selected merchant is properly assigned to the first MCC;

if the comparison satisfies a comparison threshold for the first MCC, identifying the corresponding selected merchant as being MCC misclassified; and automatically updating a secondary merchant database that includes MCC misclassified merchants to include the merchant identifier of the selected merchant.

12. The method in accordance with claim 11, wherein the method further comprises:
calculating a merchant specific MCC profile based on at least one transaction characteristic in the second set of transaction records; and
comparing the merchant specific MCC profile to the first MCC profile.

13. The method in accordance with claim 11, wherein the method further comprises:
replacing the first MCC code of the identified MCC-misclassified merchants with a new MCC in an authorization request message associated with a transaction initiated with the MCC-misclassified merchant.

14. The method in accordance with claim 11, wherein the at least one transaction characteristic is associated with a transaction amount.

15. The method in accordance with claim 11, wherein the at least one transaction characteristic is associated with a number of recurring payments, wherein the recurring payments include payment transactions having the same amount and timing over a plurality of time periods.

16. The method in accordance with claim 11, wherein the at least one transaction characteristic is associated with at least one of a date and a time of transactions.

17. The method in accordance with claim 11, wherein the at least one transaction characteristic of the records is associated with at least two of (i) a transaction amount, (ii) a number of recurring payments, wherein the recurring payments includes payment transactions having the same amount and timing over a plurality of time periods, and (iii) at least one of a date and a time of the transactions.

18. A non-transitory computer-readable storage medium that includes computer-executable instructions executable by at least one processor for identifying merchant category code (MCC) misclassifications, wherein the at least one processor is in communication with:
   a transaction database storing a plurality of transaction records each associated with one of a plurality of transactions by one of a plurality of account holders at one of a plurality of merchants, wherein each transaction record includes a transaction identifier associated with the respective transaction and a merchant identifier associated with the respective merchant;
   a merchant database storing a plurality of merchant records each associated with one of a plurality of merchants, wherein each merchant record includes the merchant identifier and a MCC assigned to the merchant identifier;
   wherein when executed by the at least one processor, the instructions cause the at least one processor to:
   generate a first MCC profile for a first MCC having a first merchant identifier assigned thereto, the first MCC profile including at least one transaction characteristic representative of merchants properly classified as the first MCC;
   compare the first MCC profile to a second set of transaction records for transactions initiated with a selected merchant having been assigned to the first MCC to determine if the selected merchant is properly assigned to the first MCC;
   if the comparison satisfies a comparison threshold for the first MCC, identify the corresponding selected merchant as being MCC misclassified; and
   automatically update a secondary merchant database that includes MCC misclassified merchants to include the merchant identifier of the selected merchant.

19. The non-transitory computer-readable of claim 18, wherein the instructions cause the at least one processor to:
   determine a merchant specific MCC profile based on at least one transaction characteristic in the second set of transaction records; and
   compare the merchant specific MCC profile to the first MCC profile.

20. The non-transitory computer-readable of claim 18, wherein the instructions cause the at least one processor to:
   replace the first MCC code of the identified MCC-misclassified merchants with a new MCC in an authorization request message associated with a transaction initiated with the MCC-misclassified merchant.

* * * * *